(No Model.)

W. FRIEND.
RUBBER ERASER.

No. 443,615. Patented Dec. 30, 1890.

Attest:
C. W. Benjamin
H. T. Fales.

Inventor:
William Friend
By Arden S. Fitch
Atty.

UNITED STATES PATENT OFFICE.

WILLIAM FRIEND, OF NEW YORK, N. Y.

RUBBER ERASER.

SPECIFICATION forming part of Letters Patent No. 443,615, dated December 30, 1890.

Application filed May 9, 1890. Serial No. 351,160. (No model.)

*To all whom it may concern:*

Be it known that I, WILLIAM FRIEND, of the city, county, and State of New York, a citizen of the United States, have invented certain new and useful Improvements in Rubber Erasers, of which the following is a full, clear, and exact description, reference being had to the accompanying drawings, forming part of this specification.

My invention relates to rubber erasers for use in erasing pencil and other marks from paper and other surfaces, and is an improvement upon the rubber eraser for which Letters Patent No. 376,081 were granted to me January 10, 1888.

My invention consists in the combination, with a rigid disk or plate provided at its circumferential edge with a continuous encircling flange, of a rubber jacket which is centrally apertured transversely and is of normally less diameter than the flanged disk or plate, and which is adapted to correspond and fit to and is mounted upon the edge flange of said disk or plate in a uniformly distended and tensioned condition thereon, substantially as and for the purpose set forth.

Figure 1:
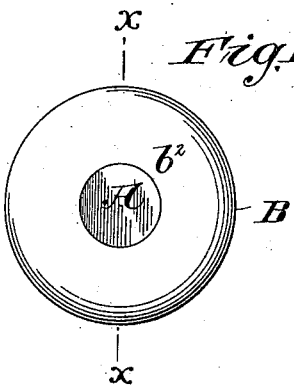
Figure 2:
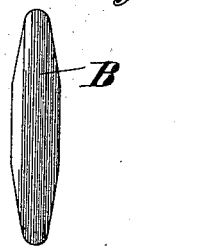
Figure 3:
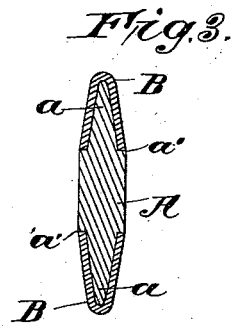
Figure 4:
Figure 5:
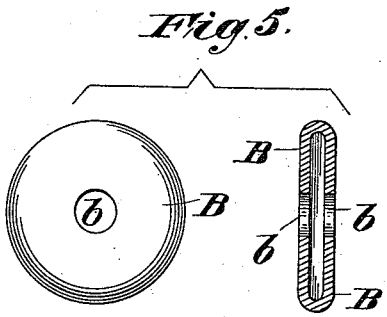
Figure 6:
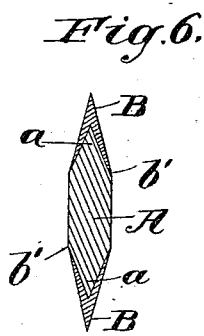

Figure 1 is a side elevation, and Fig. 2 an edge view, of a rubber eraser containing my invention. Fig. 3 is a vertical central section of the same on the line $x\,x$, Fig. 1. Fig. 4 is a side elevation of the flanged block or plate. Fig. 5 illustrates in side elevation and vertical section, the rubber jacket in its normal condition before being mounted on the plate, and Fig. 6 shows in vertical central section a modified form of the eraser.

A is a rigid disk or plate of suitable material, as of wood or metal, and preferably circular in outline, as shown. The edge of the disk or plate is formed or provided with the continuous encircling and preferably tapering flange $a$.

B is a jacket of india-rubber, which corresponds interiorly and in general outline to the flange $a$ of the plate A. The jacket is centrally apertured laterally and transversely at $b$, as shown, and is made of such size that it will in its normal condition be of less diameter than the flanged plate upon which it is to be mounted.

The jacket B is mounted upon the plate A on the flange $a$ thereof, as shown, and this may be accomplished by distending the central aperture $b$ in the jacket and inserting the plate edgewise through said distended aperture, whereupon, when the plate is thus inserted, the jacket will retract upon and fit to the flange $a$ of the plate.

The plate A may have the circumferential shoulders $a'$ where the flange meets the central portion or body of the plate, and in such case the rims of the central aperture of the jacket may be made to fit to and against said shoulders, as shown in Fig. 3; or the sides of the flange may meet the sides of the plate directly at an angle, as shown in Fig. 6, when the rims of the central aperture in the jacket may be desirably brought to a thin edge at the juncture of the flange and plate sides, as shown at $b'$, Fig. 6. The rim of the flange may be given a rounded edge, as shown in Fig. 3, or may be given an angular or sharp edge, as shown in Fig. 6.

In the hereinbefore-named patent granted to me the eraser therein described and claimed consists in a beveled rubber ring sprung into a groove on the periphery of a center piece; but I have found that in this construction the rubber ring lacks a desired firmness of seat upon the center piece.

By means of my present invention I not only seat the rubber firmly to the edge of its supporting-plate, but I also create and maintain a uniform tension throughout the entire extent of the jacket, thereby imparting an increased firmness and better erasive properties to the rubber itself, while I am at the same time enabled to employ an approximately pure rubber, free from foreign substances, as the eraser-surface. Furthermore, I provide not only an edge to the eraser at its rim adapted for use upon a closely written or lined page or drawing, but also flattened tensioned surfaces, as at $b^2$, on the sides of the jacket, constituting broad erasive surfaces.

What I claim as my invention, and desire to secure by Letters Patent, is—

In a rubber eraser, the combination, with a rigid disk or plate provided at its circumferential edge with a continuous encircling flange, of a rubber jacket which is centrally apertured transversely and is of normally less diameter than the flanged disk or plate, and which is adapted to correspond and fit to and is mounted upon the edge flange of said disk or plate in a uniformly distended and tensioned condition thereon, substantially as and for the purpose set forth.

WILLIAM FRIEND.

Witnesses:
  A. S. FITCH,
  A. T. FALES.